JOHN HARRIS.
Improvement in Milk-Carts.

No. 115,606.  
Patented June 6, 1871.

Witnesses:  
Theo. P. Haynes  
R. I. Rabeau

Inventor.  
John Harris

UNITED STATES PATENT OFFICE.

JOHN HARRIS, OF NEW YORK, N. Y.

IMPROVEMENT IN MILK-CARTS.

Specification forming part of Letters Patent No. 115,606, dated June 6, 1871.

*To all whom it may concern:*

Be it known that I, JOHN HARRIS, of the city, county, and State of New York, have invented certain new and useful Improvements in Milk-Carts, of which the following is a full, clear, and exact description, reference being had to the accompanying drawing forming part of this specification, and in which—

Figure 1:
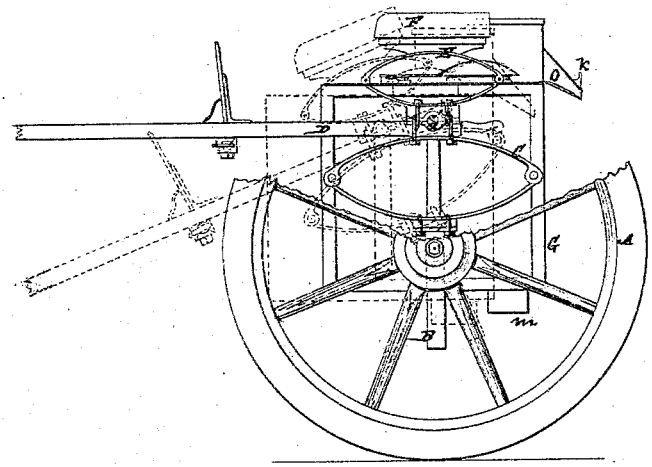
Figure 3:
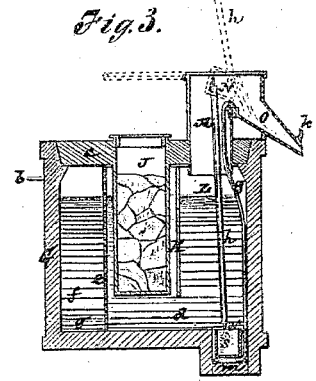
Figure 2:
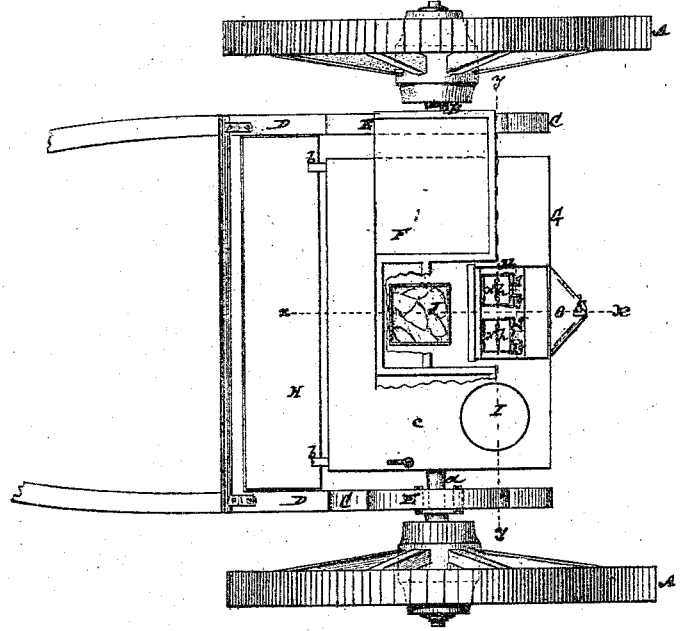
Figure 4:
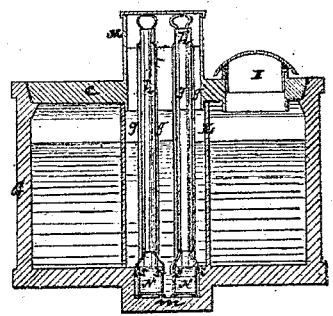

Figure 1 represents a partly-sectional side elevation of a milk-cart embracing my improvements; Fig. 2, a plan of the same with certain covers thrown back or removed; Fig. 3, a vertical section through the milk-box or reservoir taken as indicated by the line $x\ x$ in Fig. 2; and Fig. 4 a vertical section at right angles thereto through the line $y\ y$.

Similar letters of reference indicate corresponding parts.

My invention consists in a milk-cart or wagon which embraces various new and useful features, the same comprising a milk-box or reservoir, forming the body of the wagon, and preferably hung by trunnions in bearings connected with the frame or shafts of the vehicle above the axle, to provide for a suitable elevation of the reservoir, and so that in case of the horse falling, and other circumstances, it will have its perpendicularity relatively to the horizon preserved. Said reservoir, moreover, is variously partitioned or divided, and provided with an ice-box to keep the milk cool; also with a screen, to insure the cream or best part of the milk being more equally distributed in drawing from the reservoir till exhausted; likewise with tilting scoops or measures, capable of operation from the wagon or ground, as desired, and delivering the milk into a discharging-nozzle, onto which the pail to receive it may be hung, such serving of the milk not requiring the introduction of the hand into the body of the reservoir, and various other advantages being secured.

Referring to the accompanying drawing, A A represent the wheels of the wagon, hung to rotate on a cranked stationary axle or frame, D, which is connected by upper springs C with the shafts D, on which again are springs E that support the driver's seat F. G is the milk-box or reservoir forming the body of the wagon, and hung by trunnions $a$ on the shafts D, or portion of the running-gear above the cranked axle, which places said reservoir at a convenient elevation and insures its preserving a horizontal position during various angles assumed by the running-gear, or different inclinations of the shafts as arising from the falling of the horse or otherwise. This prevents all spilling or improper displacement of the milk. Springs or stops $b\ b$ may be made to project from the front of the reservoir, if desired, and caused to rest on the foot-board H to steady the reservoir or keep it from swinging under an ordinary position of the shafts, but not restricting the self-balancing character of the reservoir in case of the horse falling. Said milk-box or reservoir G is fitted with a top, $c$, capable of being removed to facilitate the cleaning of the reservoir by hose or otherwise. I is an opening in said top, covered by a lid, to provide for the filling of the reservoir with milk; and J is an ice-box, arranged to project down into the reservoir, and fitted with a lid, the ice in said box serving to keep the milk cool during warm weather. In cold weather a lamp situated within said box, and provided with suitable air-vents and smoke-outlets, may be substituted for the ice, to keep the milk from freezing. Surrounding the ice-box J, so as to leave free circulation around and beneath it, is a chamber, K, which is in communication at its bottom in the rear by a passage, $d$, with a well, L, in the back part of the reservoir, but is otherwise divided from the reservoir by a screen, $e$, arranged to extend mostly around said chamber K. A partition, $f$, leaving a passage, $g$, below, is arranged in front of this screened portion to insure an equal flow through the screen from the opposite sides of the reservoir into the chamber K. By these means the well L is always supplied with pure or screened milk passing around the ice-box, and with its top or cream equally distributed, so that subsequent drafts on the reservoir or its well L are equal in point of quality to the first. The well L is cupped at its bottom, as at $m$, to allow of the whole body of milk being drawn from the reservoir. Said well is extended up through the main lid $c$, forming an upper chamber, M, covered by a lid, and within which the hand is inserted when it is required to take out or draw off milk. Extending down the rear side of this chamber and of the well L are rails or guides $g\ g$, suitably shaped, and arranged for the travel up them of scoops or measures N N, of which there may be any desired number, according to the different measures required, said scoops clipping at their fronts the guides $g\ g$, and being pivoted, as at $s$, to rods or handles $h\ h$ extending up into the chamber M, whereby said scoops may be independently raised, as required, with a measure of milk in them, without immersion of the hand in the milk or introduction of it into the body of the reservoir, and when sufficiently raised said scoops be made to tip by passing on or over the upper ends of the guides $g\ g$, as represented in Fig. 3, and, in tipping, be caused to discharge their contents into a delivery-nozzle or spout, O, which may be provided with a hook or lip, $k$, for suspension thereon of a pail to receive the milk. This mode of scooping out the milk by sliding measures made to automatically tilt and empty themselves into a fixed discharging-nozzle or spout is safer, cleanlier, and in various ways preferable to the ordinary means employed, and the milk may be served by it, either from the wagon or the ground, with facility and dispatch.

What is here claimed, and desired to be secured by Letters Patent, is—

1. The milk-box or reservoir G, constructed to form the body of the vehicle, and pivoted, as at $a$, on opposite sides of the frame thereof, above the axle, substantially as and for the purpose herein set forth.

2. The combination, with the ice-box J, of the surrounding chamber, formed by the screen $e$ and partition K, and the well L, in combination with said chamber within the reservoir G, substantially as described.

3. The partition $f$, with its lower passage $g$, in combination with the reservoir G, the screen-chamber K, the ice-box J, and the well L, essentially as specified.

4. The combination of the guides $g\ g$ with the well L, the chamber M, the delivery-nozzle or spout O, and the sliding scoops or measures N, pivoted to their handles $h$ so as to be capable of tilting, and arranged for operation on and in relation to said guides, essentially as herein set forth.

JOHN HARRIS.

Witnesses:
   FRED. HAYNES,
   R. E. RABEAU.